United States Patent
Gupta et al.

(10) Patent No.: US 11,146,577 B2
(45) Date of Patent: Oct. 12, 2021

(54) METHODS, SYSTEMS, AND COMPUTER READABLE MEDIA FOR DETECTING AND MITIGATING EFFECTS OF ABNORMAL BEHAVIOR OF A MACHINE TYPE COMMUNICATION (MTC) DEVICE

(71) Applicant: Oracle International Corporation, Redwood Shores, CA (US)

(72) Inventors: Nitin Gupta, Bangalore (IN); Venkatesh Aravamudhan, Bangalore (IN); Raghuvamshi vasudev Singh Thakur, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 168 days.

(21) Appl. No.: 15/990,196

(22) Filed: May 25, 2018

(65) Prior Publication Data
US 2019/0364064 A1    Nov. 28, 2019

(51) Int. Cl.
*H04L 29/06*     (2006.01)
*H04L 29/08*     (2006.01)
(Continued)

(52) U.S. Cl.
CPC ...... *H04L 63/1425* (2013.01); *H04L 63/1416* (2013.01); *H04L 67/125* (2013.01); *H04W 4/70* (2018.02); *H04W 48/06* (2013.01)

(58) Field of Classification Search
CPC ............... H04L 63/1425; H04L 67/125; H04L 63/1416; H04L 63/1441; H04L 63/1408;
(Continued)

(56) References Cited

U.S. PATENT DOCUMENTS 9,025,445 B2 *  5/2015  Jain .................. H04L 65/60
                                                   370/229
9,432,150 B2    8/2016  Jain et al.
(Continued)

FOREIGN PATENT DOCUMENTS

EP        3 018 946 A1    5/2016
WO   WO 2016/156549 A1   10/2016
(Continued)

OTHER PUBLICATIONS

Commonly-assigned, co-pending U.S. Continuation U.S. Appl. No. 16/575,962 for "Methods, Systems and Computer Readable Media for Providing Integrated Service Capability Exposure Function (SCEF), Service Capability Server (SCS) and Application Server (AS) Services," (Unpublished, filed Sep. 19, 2019).
(Continued)

*Primary Examiner* — Jung W Kim
*Assistant Examiner* — Thomas Ho
(74) *Attorney, Agent, or Firm* — Jenkins, Wilson, Taylor & Hunt, P.A.

(57) ABSTRACT

A method for detecting and mitigating effects of abnormal MTC device behavior includes, at a telecommunications network node comprising one of an MME, DRA, or SCEF, receiving CP information from which core network (CN) assistance information for tuning an evolved node B (eNB) to minimize MTC device state transitions is derivable, forwarding the CP information or CN assistance information derived from the CP information to another network node, deriving, from the CP information, a rule for policing behavior of the MTC device, storing the rule in memory of the telecommunications network node, monitoring uplink communications from the MTC device, determining, using the stored rule derived from the CP information, that the MTC device is not behaving in accordance with an expected
(Continued)

behavior; and, in response performing a network security action that mitigates an effect of traffic from the MTC device on the network.

18 Claims, 9 Drawing Sheets

(51) Int. Cl.
*H04W 48/06* (2009.01)
*H04W 4/70* (2018.01)

(58) Field of Classification Search
CPC ........ H04L 43/00; H04W 48/06; H04W 4/70;
H04W 12/0027; H04W 12/12
See application file for complete search history.

(56) References Cited

U.S. PATENT DOCUMENTS

| | | | |
|---|---|---|---|
| 9,467,508 B2 | 10/2016 | Xu | |
| 9,621,450 B2 | 4/2017 | Jeong et al. | |
| 10,313,883 B2 | 6/2019 | Krishan | |
| 10,334,419 B2 | 6/2019 | Aravamudhan et al. | |
| 10,405,158 B2 | 9/2019 | McCann | |
| 10,448,449 B2 | 10/2019 | Aravamudhan et al. | |
| 10,506,403 B2 | 12/2019 | McCann | |
| 10,530,599 B2 | 1/2020 | McCann | |
| 10,616,802 B2 | 4/2020 | Krishan et al. | |
| 10,827,332 B2 | 11/2020 | McCann | |
| 2005/0220019 A1* | 10/2005 | Melpignano | H04L 69/329 370/232 |
| 2006/0075481 A1* | 4/2006 | Ross | H04L 63/1408 726/13 |
| 2007/0297333 A1* | 12/2007 | Zuk | H04L 63/1416 370/235 |
| 2012/0207113 A1 | 8/2012 | Yoon et al. | |
| 2012/0233694 A1* | 9/2012 | Baliga | G06F 21/568 726/23 |
| 2013/0041997 A1 | 2/2013 | Li et al. | |
| 2013/0044596 A1 | 2/2013 | Zhi et al. | |
| 2013/0080782 A1 | 3/2013 | Rajadurai et al. | |
| 2013/0081138 A1* | 3/2013 | Rados | G06F 21/57 726/23 |
| 2013/0272247 A1 | 10/2013 | Guo | |
| 2013/0336305 A1 | 12/2013 | Yan et al. | |
| 2014/0078968 A1 | 3/2014 | Korhonen et al. | |
| 2014/0086214 A1 | 3/2014 | Hong et al. | |
| 2014/0089442 A1 | 3/2014 | Kim et al. | |
| 2014/0153391 A1 | 6/2014 | Ludwig et al. | |
| 2014/0334386 A1 | 11/2014 | Fukumasa et al. | |
| 2014/0376426 A1 | 12/2014 | Boudreau et al. | |
| 2014/0376454 A1 | 12/2014 | Boudreau et al. | |
| 2015/0036591 A1 | 2/2015 | Cao et al. | |
| 2015/0055459 A1 | 2/2015 | Wong et al. | |
| 2015/0067328 A1 | 3/2015 | Yin | |
| 2015/0111533 A1* | 4/2015 | Chandramouli | H04W 4/70 455/410 |
| 2015/0111574 A1 | 4/2015 | Fukumasa et al. | |
| 2015/0235164 A1* | 8/2015 | Key | G06Q 50/265 705/7.17 |
| 2015/0256440 A1 | 9/2015 | Jeong et al. | |
| 2015/0319172 A1 | 11/2015 | Zhang et al. | |
| 2016/0007138 A1 | 1/2016 | Palanisamy et al. | |
| 2016/0007170 A1 | 1/2016 | Vaidya et al. | |
| 2016/0085594 A1 | 3/2016 | Wang et al. | |
| 2016/0142860 A1 | 5/2016 | Kim et al. | |
| 2016/0277243 A1 | 9/2016 | Kim et al. | |
| 2016/0277530 A1 | 9/2016 | Jung et al. | |
| 2016/0337127 A1 | 11/2016 | Schultz et al. | |
| 2016/0337841 A1* | 11/2016 | Won | H04W 4/70 |
| 2017/0093902 A1* | 3/2017 | Roundy | H04L 63/1425 |
| 2017/0126512 A1 | 5/2017 | Seed et al. | |
| 2017/0171235 A1* | 6/2017 | Mulchandani | H04L 63/1433 |
| 2017/0244670 A1* | 8/2017 | Maria | H04L 63/0227 |
| 2017/0295557 A1 | 10/2017 | Chamarty et al. | |
| 2017/0318570 A1 | 11/2017 | Shaw et al. | |
| 2017/0347283 A1* | 11/2017 | Kodaypak | H04L 41/022 |
| 2018/0035351 A1 | 2/2018 | Kodaypak | |
| 2018/0070268 A1* | 3/2018 | Iwai | H04W 8/00 |
| 2018/0077714 A1 | 3/2018 | Kodaypak et al. | |
| 2018/0092133 A1 | 3/2018 | Starsinic et al. | |
| 2018/0109632 A1* | 4/2018 | Stammers | H04L 65/1066 |
| 2018/0109941 A1 | 4/2018 | Jain et al. | |
| 2018/0124110 A1* | 5/2018 | Hunt | H04L 63/101 |
| 2018/0124544 A1 | 5/2018 | Gupta et al. | |
| 2018/0212710 A1 | 7/2018 | Ronneke et al. | |
| 2018/0227322 A1* | 8/2018 | Luo | H04L 63/1425 |
| 2018/0234291 A1 | 8/2018 | Mathison et al. | |
| 2018/0241615 A1 | 8/2018 | Livanos et al. | |
| 2018/0248711 A1 | 8/2018 | McCann | |
| 2018/0249281 A1 | 8/2018 | McCann | |
| 2018/0249282 A1 | 8/2018 | McCann | |
| 2018/0262941 A1 | 9/2018 | Huang et al. | |
| 2018/0263013 A1 | 9/2018 | Jain et al. | |
| 2018/0324671 A1 | 11/2018 | Palnati et al. | |
| 2019/0021121 A1 | 1/2019 | Aravamudhan et al. | |
| 2019/0058962 A1 | 2/2019 | Aravamudhan et al. | |
| 2019/0141527 A1 | 5/2019 | Krishan | |
| 2019/0238584 A1* | 8/2019 | Somasundaram | H04L 63/1433 |
| 2020/0021965 A1 | 1/2020 | McCann | |
| 2020/0077303 A1 | 3/2020 | Krishan et al. | |

FOREIGN PATENT DOCUMENTS

| | | |
|---|---|---|
| WO | WO 2016/200357 A1 | 12/2016 |
| WO | WO 2017/017879 A1 | 2/2017 |
| WO | WO 2018/156318 A1 | 8/2018 |
| WO | WO 2018/156319 A1 | 8/2018 |
| WO | WO 2018/156320 A1 | 8/2018 |
| WO | WO 2019/014505 A1 | 1/2019 |
| WO | WO 2019/090270 A1 | 5/2019 |

OTHER PUBLICATIONS

Non-Final Office Action for U.S. Appl. No. 15/679,124 (dated Oct. 4, 2018).

Non-Final Office Action for U.S. Appl. No. 15/604,132 (dated Oct. 2, 2018).

Non-Final Office Action for U.S. Appl. No. 15/499,847 (dated Oct. 2, 2018).

Commonly-assigned, co-pending U.S. Appl. No. 16/121,203 for "Methods, Systems and Computer Readable Media for Overload and Flow Control at a Service Capability Exposure Function (SCEF)," (Unpublished, filed Sep. 4, 2018).

Commonly-assigned, co-pending International Patent Application Serial No. PCT/US18/41911 for "Methods, Systems, and Computer Readable Media for Dynamically Provisioning Session Timeout Information in a Communications Network," (Unpublished, filed Jul. 12, 2018).

"3rd Generation Partnership Project; Technical Specification Group Services and System Aspects; Architecture enhancements to facilitate communications with packet data networks and applications (Release 15)," 3GPP TS 23.682, V15.5.0, pp. 1-125 (Jun. 2018).

Non-Final Office Action for U.S. Appl. No. 15/804,974 (dated May 10, 2018).

Notification of Transmittal of the International Search Report and the Written Opinion of the International Searching Authority, or the Declaration for International Application No. PCT/US2018/016044 (dated Apr. 24, 2018).

Notification of Transmittal of the International Search Report and the Written Opinion of the International Searching Authority, or the Declaration for International Application No. PCT/US2018/016047 (dated Apr. 24, 2018).

Notification of Transmittal of the International Search Report and the Written Opinion of the International Searching Authority, or the Declaration for International Application No. PCT/US2018/016045 (dated Apr. 24, 2018).

Commonly-assigned, co-pending U.S. Appl. No. 15/804,974 for "Methods, Systems, and Computer Readable Media for using Authentication Validation Time Periods," (Unpublished, filed Nov. 6, 2017).

(56) References Cited

OTHER PUBLICATIONS

"Universal Mobile Telecommunications System (UMTS); LTE; Diameter-based T4 Interface for communications with packet data networks and applications (3GPP TS 29.337 V14.2.0 Release 14)," ETSI TS 129 337 V14.2.0, pp. 1-25 (Oct. 2017).
Commonly-assigned, co-pending U.S. Appl. No. 15/679,124 for "Methods, Systems, and Computer Readable Media for Optimizing Machine Type Communication (MTC) Device Signaling," (Unpublished, filed Aug. 16, 2017).
Commonly-assigned, co-pending U.S. Appl. No. 15/649,627 for "Methods, Systems, and Computer Readable Media for Dynamically Provisioning Session Timeout Information in a Communications Network," (Unpublished, filed Jul. 13, 2017).
"Universal Mobile Telecommunications System (UMTS); LTE; Evolved Packet System (EPS); Mobility Management Entity (MME) and Serving GPRS Support Node (SGSN) related interfaces based on Diameter protocol (3GPP TS 29.272 V14.4.0 Release 14)," ETSI TS 129 272 V14.4.0, pp. 1-171 (Jul. 2017).
"Universal Mobile Telecommunications System (UMTS); LTE; Home Subscriber Server (HSS) diameter interfaces for interworking with packet data networks and applications (3GPP TS 29.336 V14.1.0 Release 14)," ETSI TS 129 336 V14.1.0, pp. 1-66 (May 2017).
"Digital cellular telecommunications system (Phase 2+) (GSM); Universal Mobile Telecommunications System (UMTS); LTE; Circuit Switched (CS) fallback in Evolved Packet System (EPS); Stage 2 (3GPP TS 23.272 V14.0.0 Release 14)," ETSI TS 123 272 V14.0.0, pp. 1-105 (May 2017).
"LTE; General Packet Radio Service (GPRS) enhancements for Evolved Universal Terrestrial Radio Access Network (E-UTRAN) access (3GPP TS 23.401 V14.3.0 Release 14)," ETSI TS 123 401 V14.3.0, pp. 1-392 (May 2017).
"Universal Mobile Telecommunications System (UMTS); LTE; Tsp interface protocol between the MTC Interworking Function (MTC-IWF) and Service Capability Server (SCS) (3GPP TS 29.368 V14.1.0 Release 14)," ETSI TS 129 368 V14.1.0, pp. 1-34 (Apr. 2017).
"3rd Generation Partnership Project; Technical Specification Group Services and System Aspects; Architecture enhancements to facilitate communications with packet data networks and applications (Release 15)," 3GPP TS 23.682 V15.0.0, pp. 1-109 (Mar. 2017).
"3rd Generation Partnership Project; Technical Specification Group Services and System Aspects; Architecture enhancements to facilitate communications with packet data networks and applications (Release 14)," 3GPP TS 23.682 V14.2.0, pp. 1-104 (Dec. 2016).
"Change Request," InterDigital, Meeting ARC#25, Doc# ARC-2016-0439-TS-0026_sec5_sec6.1, pp. 1-16 (Oct. 17, 2016).
Abu-Lebdeh et al., "A Virtual Network PaaS for 3GPP 4G and Beyond Core Network Services," pp. 1-7 (Aug. 20, 2016).
Donovan, "Diameter Routing Message Priority," RFC 7944, pp. 1-18 (Aug. 2016).
"Universal Mobile Telecommunications System (UMTS); Mobility Management Entity (MME) and Serving GPRS Support Node (SGSN) interfaces for interworking with packet data and applications (3GPP TS 29.128 V13.0.0, Release 13)," ETSI TS 129.128 V13.0.0, pp. 1-40 (May 2016).
"Universal Mobile Telecommunications System (UMTS); LTE; Home Subscriber Server (HSS) diameter interfaces for interworking with packet data networks and applications (3GPP TS 29.339 version 13.3.0 Release 13)," ETSI TS 129 336 V13.3.0, pp. 1-56 (Apr. 2016).
"3rd Generation Partnership Project; Technical Specification Group Services and System Aspects; Architecture enhancements to facilitate communications with packet data networks and applications (Release 13)," 3GPP TS 23.682 V13.5.0, pp. 1-90 (Mar. 2016).
"Digital cellular telecommunications system (Phase 2+) (GSM); Universal Mobile Telecommunications System (UMTS); LTE; Architecture enhancements to facilitate communications with packet data networks and applictions (3GPP TS 23.682 V13.4.0 Release 13)," ETSI TS 123 682 V13.4.0, pp. 1-82 (Mar. 2016).

"Universal Mobile Telecommunication System (UMTS); LTE; Home Subscriber Server (HSS) diameter interfaces for interworking with packet data networks and applications (3GPP TS 29.336 V13.2.0 Release 13)," ETSI TS 129.336 V13.2.0, pp. 1-48 (Mar. 2016).
"Routing Non-IP Data to/from Multiple UE Applications and Multiple SCS/AS's," Convida Wireless, 3FPP TSG-SA WG2 #113AH, pp. 1-6 (Feb. 2016).
"Cloud Innovation Solution," ZTE Corporation, pp. 1-31 (2016).
Taleb et al., "EASE: EPC as a Service to Ease Mobile Core Network Deployment over Cloud," IEEE Network, pp. 78-88 (Mar./Apr. 2015).
"Universal Mobile Telecommunications System (UMTS); LTE; Tsp interface protocol between the MTC Interworking Function (MTC-IWF) and Service Capability Server (SCS) (3GPP TS 29.368 V12.2.0 Release 12)," ETSI TS 129.368 V12.2.0, pp. 1-29 (Oct. 2014).
Mendyk, "NFV + SDN—network in the cloud or cloud in the network?," NFV/IT Transformation, pp. 1-3 (Oct. 7, 2014).
Taleb et al., "Virtualizing the LTE Evolved Packet Core (EPC)," Proc. European Conf. on Networks and Communications (EUCNC), pp. 1-2 (Jun. 2014).
Fajardo et al., "Diameter Base Protocol," RFC 6733, pp. 1-152 (Oct. 2012).
"Digital cellular telecommunications system (Phase 2+); Universal Mobile Telecommunications System (UMTS); LTE; Service requirements for Machine-Type Communications (MTC); Stage 1 (3GPP TS 22.368 V11.6.0 Release 11)," ETSI TS 122 368 V11.6.0, pp. 1-20 (Sep. 2012).
Notice of Allowance and Fee(s) Due for U.S. Appl. No. 15/679,124 (dated Feb. 12, 2019).
Notification of Transmittal of the International Search Report and the Written Opinion of the International Searching Authority, or the Declaration for International Application Serial No. PCT/US2018/059282 (dated Feb. 11, 2019).
Non-Final Office Action for U.S. Appl. No. 15/649,627 (dated Jan. 23, 2019).
Applicant-Initiated Interview Summary for U.S. Appl. No. 15/499,847 (dated Jan. 22, 2019).
Applicant-Initiated Interview Summary for U.S. Appl. No. 15/604,132 (dated Jan. 22, 2019).
Non-Final Office Action for U.S. Appl. No. 15/608,595 (dated Jan. 8, 2019).
"3rd Generation Partnership Project; Technical Specification Group Core Network and Terminals; Home Subscriber Server (HSS) diameter interfaces for interworking with packet data networks and applications (Release 14)," 3GPP TS 29.336 V.14.1.0, pp. 1-67 (May 2017).
"3rd Generation Partnership Project; Technical Specification Group Services and System Aspects; Architecture enhancements to facilitate communications with packet data networks and applications (Release 15)," 3GPP TS 23.682, V15.4.0, pp. 1-122 (Mar. 2018).
"3rd Generation Partnership Project; Technical Specification Group Services and System Aspects; General Packet Radio Service (GPRS) enhancements for Evolved Universal Terrestrial Radio Access Network (E-UTRAN) access (Release 15)," 3GPP TS 23.401, V15.3.0, pp. 1-405 (Mar. 2018).
"LTE; Evolved Universal Terrestrial Radio Access Network (E-UTRAN); S1 Application Protocol (S1AP) (3GPP TS 36.413 version 14.2.0 Release 14)," ETSI TS 136 413, V14.2.0, pp. 1-349 (Apr. 2017).
Notice of Allowance and Fee(s) Due for U.S. Appl. No. 15/804,974 (dated Nov. 13, 2018).
Notification of Transmittal of the International Search Report and the Written Opinion of the International Searching Authority, or the Declaration for International Application Serial No. PCT/US2018/041911 (dated Oct. 12, 2018).
Notice of Allowance and Fee(s) Due for U.S. Appl. No. 15/649,627 (dated May 30, 2019).
Final Office Action for U.S. Appl. No. 15/608,595 (dated Apr. 29, 2019).
Applicant-Initiated Interview Summary for U.S. Appl. No. 15/608,595 (dated Apr. 22, 2019).

(56) References Cited

OTHER PUBLICATIONS

Notice of Allowance and Fee(s) Due for U.S. Appl. No. 15/499,847 (dated Apr. 17, 2019).

Final Office Action for U.S. Appl. No. 15/604,132 (dated Apr. 16, 2019).

Notice of Allowance and Fee(s) Due for U.S. Appl. No. 16/121,203 (dated Nov. 18, 2019).

Notice of Allowance and Fee(s) Due, Examiner-Initiated Interview Summary, and AFCP 2.0 Decision for U.S. Appl. No. 15/608,595 (dated Aug. 20, 2019).

Notice of Allowance and Fee(s) Due and AFCP 2.0 Decision for U.S. Appl. No. 15/604,132 (dated Aug. 8, 2019).

Communication of European publication number and information on the application of Article 67(3) EPC for European Patent Application Serial No. 18815391.0 (Aug. 19, 2020).

Notice of Allowance and Fee(s) Due for U.S. Appl. No. 16/575,962 (dated Jul. 28, 2020).

Communication pursuant to Article 94(3) EPC for European Patent Application Serial No. 18 706 338.3 (Jul. 20, 2020).

Communication pursuant to Article 94(3) EPC for European Patent Application Serial No. 18 705 270.9 (Jul. 20, 2020).

Communication pursuant to Article 94(3) EPC for European Patent Application Serial No. 18 704 770.9 (Jul. 14, 2020).

"3rd Generation Partnership Project; Technical Specification Group Core Network and Terminals; Location Services (LCS) Diameter-based SLh interface for Control Plane LCS (Release 16)," 3GPP TS 29.173 V16.0.0, pp. 1-19 (Jul. 2020).

"3rd Generation Partnership Project; Technical Specification Group Services and System Aspects; Architecture enhancements to facilitate communications with packet data networks and applications (Release 16)," 3GPP TS 23.682 V16.7.0, pp. 1-134 (Jul. 2020).

"3rd Generation Partnership Project; Technical Specification Group Core Network and Terminals; Home Subscriber Server (HSS) diameter interfaces for interworking with packet data networks and applications (Release 16)," 3GPP TS 29.336 V16.2.0, pp. 1-79 (Jun. 2020).

"3rd Generation Partnership Project; Technical Specification Group Core Network and Terminals; Evolved Packet System (EPS); Mobility Management Entity (MME) and Serving GPRS Support Node (SGSN) related interfaces System (EPS); Mobility Management Entity (MME) and Serving GPRS Support Node (SGSN) related interfaces based on Diameter protocol (Release 16)," 3GPP TS 29.272 V16.3.0, pp. 1-177 (Jun. 2020).

"3rd Generation Partnership Project; Technical Specification Group Core Network and Terminals; T8 reference point for Northbound APIs; (Release 16)," 3GPP TS 29.122 V16.6.0, pp. 1-360 (Jun. 2020).

Communication of European publication number and information on the application of Article 67(3) EPC for European Patent Application Serial No. 18755330.0 (Apr. 22, 2020).

"3rd Generation Partnership Project; Technical Specification Group Core Network and Terminals; Mobility Management Entity (MME) and Serving GPRS Support Node (SGSN) interfaces for interworking with packet data networks and applications (Release 16)," 3GPP TS 29.128 V16.1.0, pp. 1-51 (Mar. 2020).

"Oracle® Communications Diameter Signaling Router Service Capability Exposure Function User's Guide," Release 8.4, F12301-02, Oracle, pp. 1-150 (Jan. 2020).

Communication under Rule 71 (3) EPC Intention to Grant for European Patent Application Serial No. 18 704 770.9 (dated Jul. 28, 2021).

Examination Report for European Patent Application No. 18705270.9 (dated Jun. 25, 2021).

Notice of Decision to Grant for European Patent Application No. 18755330.0 (dated Jul. 29, 2021).

* cited by examiner

METHODS, SYSTEMS, AND COMPUTER READABLE MEDIA FOR DETECTING AND MITIGATING EFFECTS OF ABNORMAL BEHAVIOR OF A MACHINE TYPE COMMUNICATION (MTC) DEVICE

TECHNICAL FIELD

The subject matter described herein relates to monitoring behavior of MTC devices. More particularly, the subject matter described herein relates methods, systems, and computer readable media for detecting and mitigating effects of abnormal behavior of an MTC device.

BACKGROUND

Internet of Things (IoT) sensors and devices are expected to drive the data traffic growth multifold. Third Generation Partnership Project (3GPP) work is in progress on a 5G network architecture to enable IoT sensors and devices across industries for their interworking with the 3GPP network. In 3GPP standards, a device, such as a sensor, that communicates with the network without human interaction is referred to as an MTC device. MTC devices, such as sensors, may be in a sleep state for a time period, enter a wake up state, transmit data to the network, and then return to the sleep state. 3GPP standards have proposed different approaches for Internet protocol (IP) data and non-IP data communication between MTC devices and the service capability exposure function/application server (SCEF/AS) network node. These MTC devices will be operating based on pre-provisioned configuration and network based control, and they would have different patterns of their operating day cycles. These devices will have their profiles fine-tuned based on their usage and nature of the industry for which they are deployed. The MTC payload data generated by MTC devices would be of different characteristics than traditional mobile data.

Current 3GPP specifications have incorporated cellular internet of things (C-IoT) optimization in the long term evolution (LTE) core networking for MTC devices with miniscule data transfers. The MTC network architecture is overlaid on the LTE network to achieve end to end connectivity of the MTC devices to the application server (AS) through the SCEF. 3GPP standards define Communication Pattern (CP) information, a mechanism for the network to optimize and improve signaling to MTC device[s] exhibiting a specific behavior. The CP information is provided by the AS or home subscriber server (HSS) to the MME. The MME uses the CP information to derive core network (CN) assistance parameters for the eNB. The MME provides the CN assistance parameters to the eNB using the expected UE behavior information element (IE). The CN assistance information carried by the expected UE behavior IE assists the eNB in minimizing UE state transitions and achieving optimum network behavior.

Current 3GPP specifications do not address the detection or handling of malfunctioning/misbehaving MTC devices in the network. In absence of such detection and handling, a malfunctioning MTC device could severely impact the network, for example, by causing a denial of service outage or limited service.

Accordingly, there exists a need for methods, systems, and computer readable media for detecting and mitigating effects of abnormal MTC device behavior.

SUMMARY

Methods, systems, and computer readable media for detecting and mitigating effects of abnormal MTC device behavior are disclosed. One method for detecting and mitigating effects of abnormal MTC device behavior includes, at a telecommunications network node comprising one of an MME, a Diameter routing agent (DRA), and an SCEF, receiving CP information from which core network (CN) assistance information for tuning an evolved node B (eNB) to minimize MTC device state transitions is derivable, forwarding the CP information the CN assistance information derived from the CP information to another network node, deriving, from the CP information, a rule for policing behavior of the MTC device, storing the rule in memory of the telecommunications network node, monitoring uplink communications from the MTC device, determining, using the stored rule derived from the CP information, that the MTC device is not behaving in accordance with an expected behavior; and, in response, performing a network security action that mitigates an effect of traffic from the MTC device on the network.

In one exemplary implementation, the steps for detecting and mitigating effects of abnormal MTC device behavior are performed at an MME.

In another exemplary implementation, the steps for detecting and mitigating abnormal MTC device behavior are performed by a DRA.

In yet another exemplary implementation, the steps for detecting and mitigating effects of abnormal MTC device behavior are performed at a SCEF.

In one exemplary implementation, the CP information that is stored and subsequently used for detecting and mitigating effects of abnormal MTC device behavior is received from a home subscriber server (HSS).

In one exemplary implementation, the CP information used to derive the rule for detecting abnormal MTC device behavior specifies a duration that the MTC device is expected to communicate with the network and determining that the MTC device is not behaving in accordance with the expected behavior includes detecting that the communication exceeds the duration.

In one exemplary implementation, the CP information used to derive the rule for detecting abnormal MTC device behavior specifies an occurrence count of a number of communications from the MTC device within a time period and determining that the MTC device is not behaving in accordance with the expected behavior includes detecting that the number of communications from the MTC device within the time period exceeds the count.

In one exemplary implementation, an indication of behavior of the MTC device is logged. The indication of behavior may be the actual behavior of the device, i.e., a record of communications between the MTC device and the network. In another example, the indication of behavior may be a statistical measure of communications between the MTC device and the network. In yet another example, the indication of behavior may be an alert indicating that the MTC device is not behaving as expected.

In one exemplary implementation, performing the network security action includes blocking communications from the MTC device.

In one exemplary implementation, performing the network security action includes notifying a network operator of behavior of the MTC device that is not in accordance with the expected behavior.

A system for detecting and mitigating effects of MTC device behavior includes a telecommunications network node comprising one of an MME a DRA, and an SCEF and having at least one processor. The system further includes an MTC device behavior monitor comprising a component of the telecommunications network node and implemented by the at least one processor for receiving CP information from which core network (CN) assistance information for tuning an evolved node B (eNB) to minimize MTC device state transitions is derivable, forwarding the CP information or the CN assistance information derived from the CP information to another network node, deriving, from the CP information, a rule for policing behavior of the MTC device and storing the rule in memory of the telecommunications network node, monitoring uplink communications from the MTC device, determining, using the stored rule derived from the CP information, that the MTC device is not behaving in accordance with an expected behavior; and, in response to determining that the MTC device is not behaving in accordance with the expected behavior, performing a network security action that mitigates an effect of traffic from the MTC device on the network.

In one exemplary implementation, the computing platform comprises an MME.

In yet another exemplary implementation, the computing platform comprises a DRA.

In yet another exemplary implementation, the computing platform comprises an SCEF.

In one exemplary implementation, the abnormal MTC device behavior monitor is configured to log an indication of behavior of the MTC device.

In yet another exemplary implementation, the abnormal MTC device behavior monitor is configured to block communications from the MTC device.

In yet another exemplary implementation, the abnormal MTC device behavior monitor is configured to notify a network operator of behavior of the MTC device that is not in accordance with the expected behavior.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
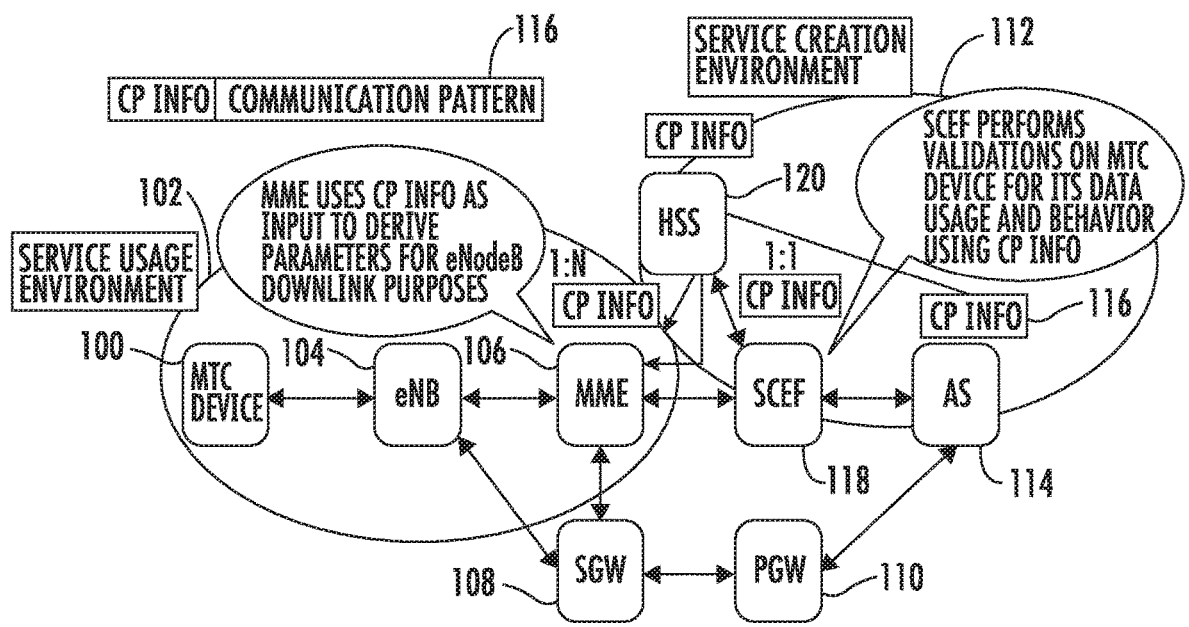
FIG. 1 is a block diagram illustrating the flow of CP information as per 3GPP specifications.

FIG. 1 is a network diagram illustrating the use of communication pattern (CP) information to control one or more machine type communication (MTC) devices. In FIG. 1, an MTC device 100 resides in a service usage environment 102. MTC device 100 communicates with the network through evolved node B (eNB) 104 and either mobility management entity (MME) 106 or serving gateway (SGW) 108. A packet gateway (PGW) 110 provides packet communications between serving gateway 108 and a service creation environment 112. Service creation environment 112 includes an application server (AS) 114, which defines the communication pattern information. In the illustrated example, these parameters are communicated to eNB 104 through communication pattern (CP) information 116. AS 114 sends the CP information for MTC device 100 to SCEF 118. SCEF 118 performs validations for the MTC device for the data usage expected by MTC device 100 and its behavior using the CP information. That is, SCEF 118 determines whether the MTC device will be allowed to communicate with the network using the behaviors specified in the CP information. This validation is an initial step that occurs prior to communicating the CP information to downstream entities and prior to receiving communications from the MTC device. This validation is not a policing of uplink communications from the MTC device using rules derived from the CP information.

Once the MTC device 100 is validated, SCEF 118 communicates the CP information to home subscriber server (HSS) 120. HSS 120 stores subscription records for devices, such as MTC device 100. HSS 120 communicates the CP information 116 to MME 106. MME 106 uses the CP information as input to derive CN assistance parameters for eNB 104. eNB 104 uses the CN assistance parameters to optimize its resources for communication with MTC device 100 and to minimize state transitions of MTC device 100. For example, the CP information parameters may specify that the user equipment (UE) or MTC device 100 communicates periodically with the network or only on demand. In another example, the CP information parameters may specify a communication duration, which indicates the duration of time that MTC device 100 communicates with the network. Other examples of CP information parameters include the interval time between periodic communications, the scheduled communication time, and whether the UE is stationary or mobile.

Thus, MME 106 uses the CP info parameters to inform eNB 104 as to what communications to expect from MTC device 100. According to the subject matter described herein, rather than simply using the CP information parameters to derive the CN assistance information used by the eNB to tune itself to minimize UE state transitions and optimize eNB resource utilization, MME 106 or another node in the network, such as SCEF 118 or a DRA (not shown in FIG. 1), may use the CP information parameters to derive rules used to determine whether an MTC device is behaving as expected and to perform network security actions to limit the effect of misbehaving MTC device traffic when the MTC device is not behaving as expected. Examples of such network security actions include blocking packets from a misbehaving MTC device, buffering packets from a misbehaving MTC device, dropping packets from a misbehaving MTC device that exceed a threshold volume of packets per unit time, generating a network security notification and communicating the notification to a network operator, etc.

Figure 2:
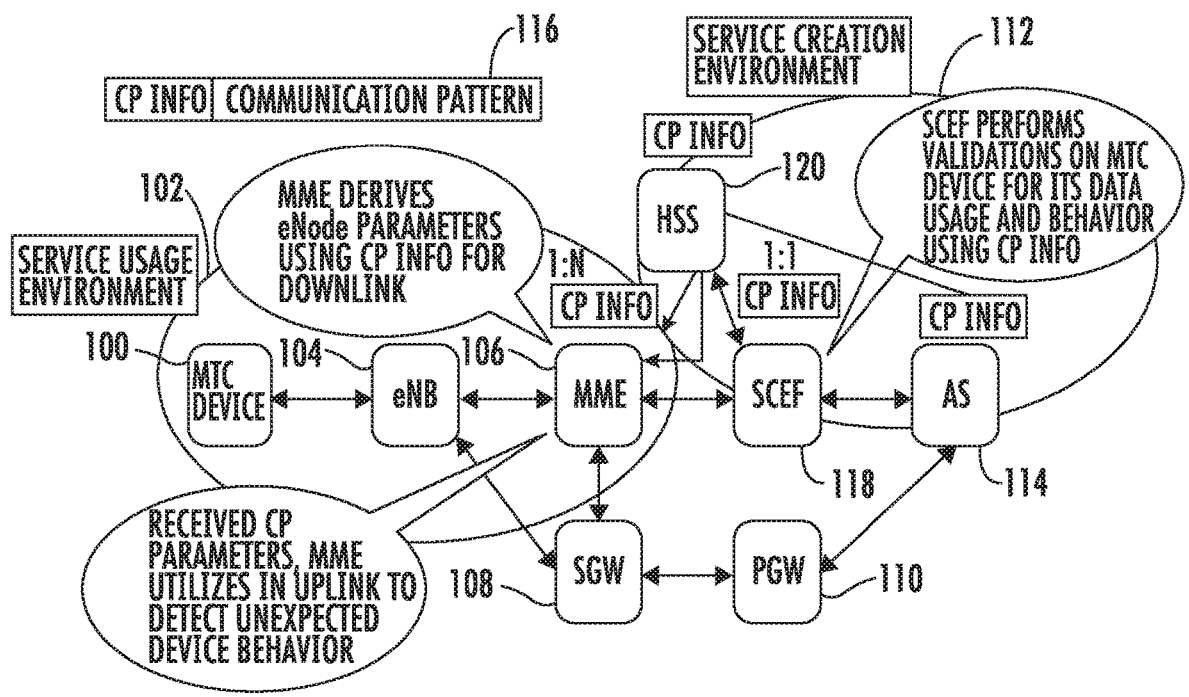
FIG. 2 is a network diagram illustrating the use of CP information to detect abnormal MTC device behavior.

Referring to FIG. 2, the message flow is similar to that illustrated in FIG. 1. That is, AS 114 provides the CP information parameters to SCEF 118. SCEF 118 performs validations on MTC device 100 for its data usage and behavior, filters the CP information, and provides the filtered CP information to HSS 120. HSS 120 provides the CP information to MME 106, which derives CN assistance parameters using the CP information and provides the CN assistance parameters to eNB 104. eNB 104 uses the derived parameters to configure its resources for optimum communications with MTC device 100.

However, in addition to deriving the CN assistance parameters for the eNB, MME 106 derives a rule for policing behavior of MTC device 100, stores rule derived from the received CP information parameters, and uses the rule derived from the CP information parameters to police uplink communications from MTC device 100 and determine whether MTC device 100 is behaving as expected. If MME 106 determines that MTC device 100 is not behaving as expected, MME 106 may perform a network security action, such as blocking communications from MTC device 100, logging communications from MTC device 100 and/or notifying a network operator regarding unexpected behavior of MTC device 100. Notifying the network operator may be effected through any suitable means configured by the network operators. Example notification methods include short message (SMS), email, hypertext transfer protocol (HTTP), etc.

Figure 3:
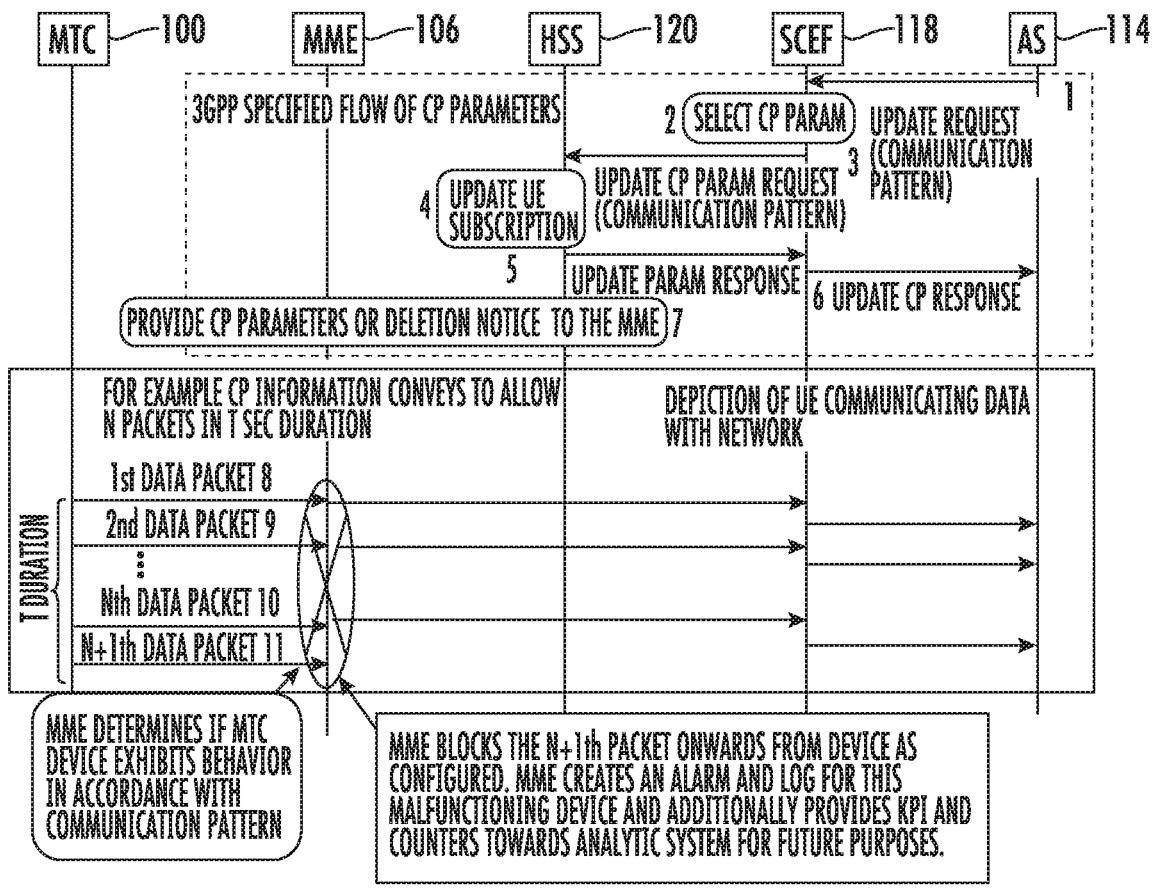
FIG. 3 is a message flow diagram illustrating the use of CP information to detect abnormal MTC device behavior.

FIG. 3 is a message flow diagram illustrating exemplary operations performed by MME 106 to police uplink communications from MTC device 100 using CP information. Referring to FIG. 3, in line 1 of the message flow diagram, AS 114 sends an update request message to SCEF 118. AS 114 uses this procedure to add, change, or delete CP information for MTC device 100. The update request may include an identifier for MTC device 100. In one example, the identifier may be a mobile subscriber integrated services digital network (MSISDN) number identifying MTC device 100. The update request may also include an identifier of AS 114, reference identifiers, CP parameter sets, validity times, and AS reference IDs for deletion.

Upon receiving the update request, SCEF 118 checks to see if AS 114 is authorized to send CP requests. SCEF 118 filters and selects the CP information parameter sets for add/modify/delete based on operator policy and/or configuration. In line 3, SCEF 118 sends the CP information parameters to HSS 120.

HSS 120 examines the update CP parameter request message, e.g., with regard to the existence of the external identifier or MSISDN parameter. HSS 120 resolves the external identifier or MSISDN to an international mobile subscriber identifier (IMSI) and stores the CP parameter sets and their validity times as part of subscription data for the MTC device identified by the IMSI. The reason for storing the CP parameter sets by HSS 120 is so that the CP parameter sets can be forwarded to the serving MME when the serving MME is changed due to mobility of MTC device 100.

HSS 120 determines that a stored CP parameter set is to be modified by the fact that the SCEF reference ID associated with the CP parameters matches an SCEF reference ID for the CP parameter set already stored for a given MTC device. If HSS 120 determines that an existing CP parameter set is to be modified, HSS 120 discards the previously stored CP parameter set and stores the new CP parameter set under the same SCEF reference ID. HSS 120 stores the new CP parameter set along with the SCEF reference ID and validity time.

In line 5, HSS 120 sends the update CP parameter response with an SCEF reference ID and cause to SCEF 118. The cause value indicates a successful subscription update or the reason of failure of the subscription update. The update response message informs AS 114 as to whether the provisioning of the CP parameter set was successful. SCEF 118 sends a corresponding update response message to AS 114 in line 6. In line 7, HSS 120 invokes an insert subscription data procedure to send the CP parameter sets with the corresponding validity times, SCEF reference IDs, and SCEF reference IDs for deletion to MME 106.

Rather than simply using the CP parameters to derive the CN assistance information and providing the CN assistance information to eNB 104, which uses the CN assistance information to optimize communications with MTC device 100, MME 106 derives a rule from the parameters, stores the rule derived from the parameters in memory of MME 106, and uses the rule derived from the parameters to police uplink communications from MTC device 100. In the illustrated example, it is assumed that the rule derived from the CP information indicates that MTC device 100 is allowed to send N packets every T seconds. For data packets 1 to N illustrated in lines 8-10 of FIG. 3, MME 106 determines that the MTC device 100 is performing as expected. However, upon receipt of the N+1 data packet illustrated in line 11 of FIG. 3, MME 106 blocks the N+1$^{th}$ data packet and any subsequent data packets from MTC device 100, generates an alarm, and logs an indication of the occurrence of the event that violated the MTC behavior defined by the CP information. MME 106 may provide an event log, packet counters, or other key performance indicator (KPI) information to an analytic system (not shown in FIG. 3) for further analysis.

Figure 4:
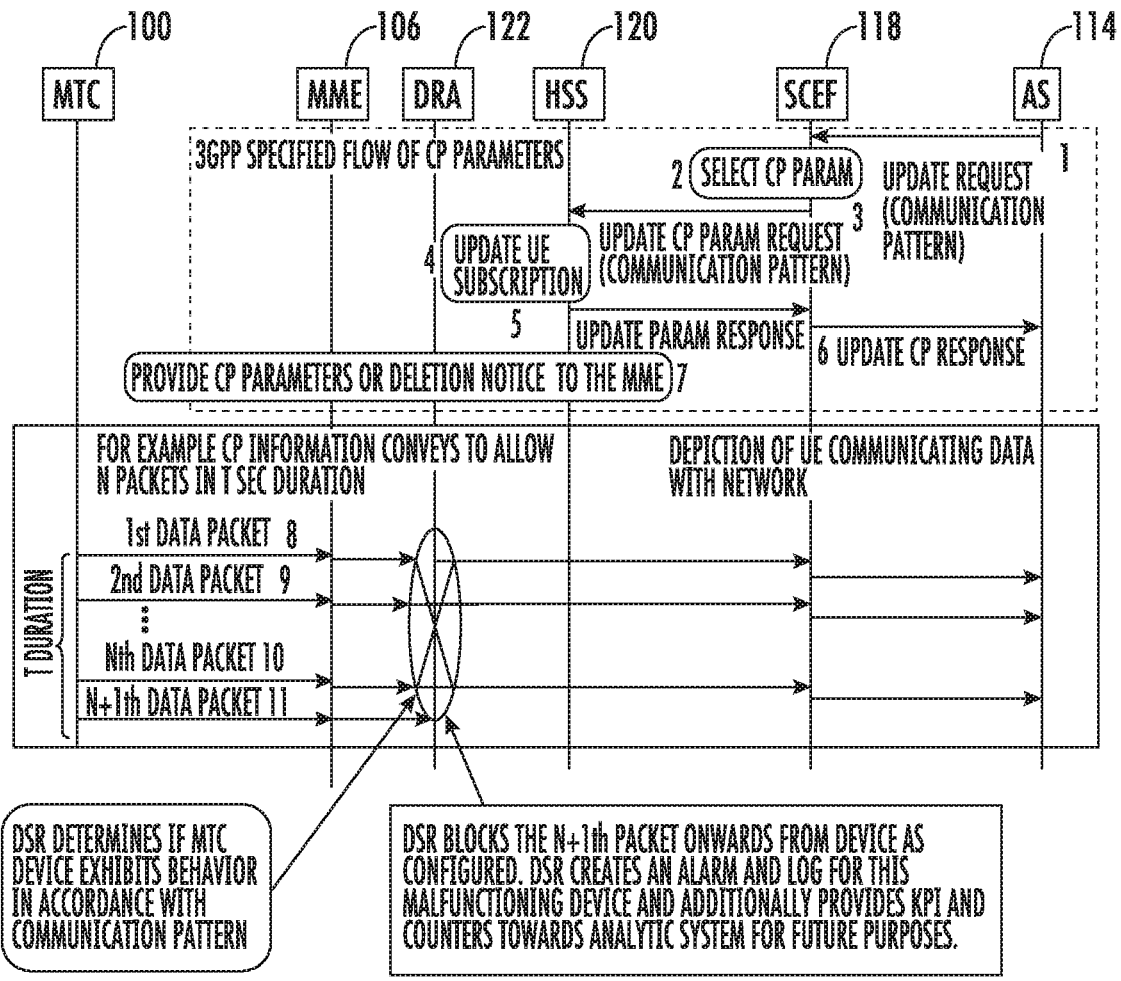
FIG. 4 is a message flow diagram illustrating detecting and mitigating effects of abnormal MTC device behavior at a DRA.

In FIG. 3, the detection of abnormal MTC device behavior is performed by MME 106. In an alternate implementation, a misbehaving MTC device may be detected by a DRA. Such an implementation is illustrated in FIG. 4. FIG. 4 is a message flow diagram illustrating exemplary operations performed by MME 106 to police uplink communications from MTC device 100 using CP information. Referring to FIG. 4, in line 1 of the message flow diagram, AS 114 sends an update request message to SCEF 118. AS 114 uses this procedure to add, change, or delete CP information for MTC device 100. The update request may include an identifier for MTC device 100. In one example, the identifier may be a mobile subscriber integrated services digital network (MSISDN) number identifying MTC device 100. The update request may also include an identifier of AS 114, reference identifiers, CP parameter sets, validity times, and AS reference IDs for deletion.

Upon receiving the update request, SCEF 118 checks to see if AS 114 is authorized to send CP requests. SCEF 114 filters and selects the CP information parameter sets for add/modify/delete based on operator policy and/or configuration. In line 3, SCEF 118 sends the CP parameters to HSS 120.

HSS 120 examines the update CP parameter request message, e.g., with regard to the existence of the external identifier or MSISDN parameter. HSS 120 resolves the external identifier or MSISDN to an international mobile subscriber identifier (IMSI) and stores the CP parameter sets and their validity times as part of subscription data for the MTC device identified by the IMSI. The reason for storing the CP parameter sets by HSS 120 is so that the CP parameter sets can be forwarded to the serving MME when the serving MME is changed due to mobility of MTC device 100.

HSS 120 determines that a stored CP parameter set is to be modified by the fact that the SCEF reference ID associated with the CP parameters matches an SCEF reference ID for the CP parameter set already stored for a given MTC device. If HSS 120 determines that an existing CP parameter set is to be modified, HSS 120 discards the previously stored CP parameter set and stores the new CP parameter set under the same SCEF reference ID. HSS 120 stores the new CP parameter set along with the SCEF reference ID and validity time.

In line 5, HSS 120 sends the update CP parameter response with an SCEF reference ID and cause to SCEF 118. The cause value indicates a successful subscription update or the reason of failure of the subscription update. The update response message informs AS 114 as to whether the provisioning of the CP parameter set was successful. SCEF 118 sends a corresponding update response message to AS 114 in line 6. In line 7, HSS 120 invokes an insert subscription data procedure to send the CP parameter sets with the corresponding validity times, SCEF reference IDs, and SCEF reference IDs for deletion to MME 106.

DRA 122 receives the message from HSS 120 including the CP information parameters and routes the message with the CP information parameters to MME 106. In addition to routing the message, DRA 122 derives a rule for policing uplink communications from MTC device 100, stores the rule derived from the CP information parameters, and uses the rule to police uplink communications from MTC device 100. In the illustrated example, it is assumed that the rule derived from the CP information indicates that MTC device 100 is allowed to send N packets every T seconds. For data packets 1 to N illustrated by lines 8-10 in FIG. 4, DRA 122 determines that the MTC device 100 is performing as expected. However, upon receipt of the N+1th data packet illustrated by line 11 in FIG. 4, DRA 122 blocks the N+1th data packet and any subsequent data packets from MTC device 100, generates an alarm, and logs an indication of the occurrence of the event that violated the MTC behavior defined by the CP information. DRA 122 may provide the event log, packet counters, or other KPI information to an analytic system (not shown in FIG. 3) for further analysis. As will be explained in further detail below, locating abnormal MTC device detection at a DRA 122 may be advantageous because DRA 122 is typically connected to multiple MMEs and can thus detect misbehaving MTC device behavior for MTC devices connected to different MMEs.

Figure 5:
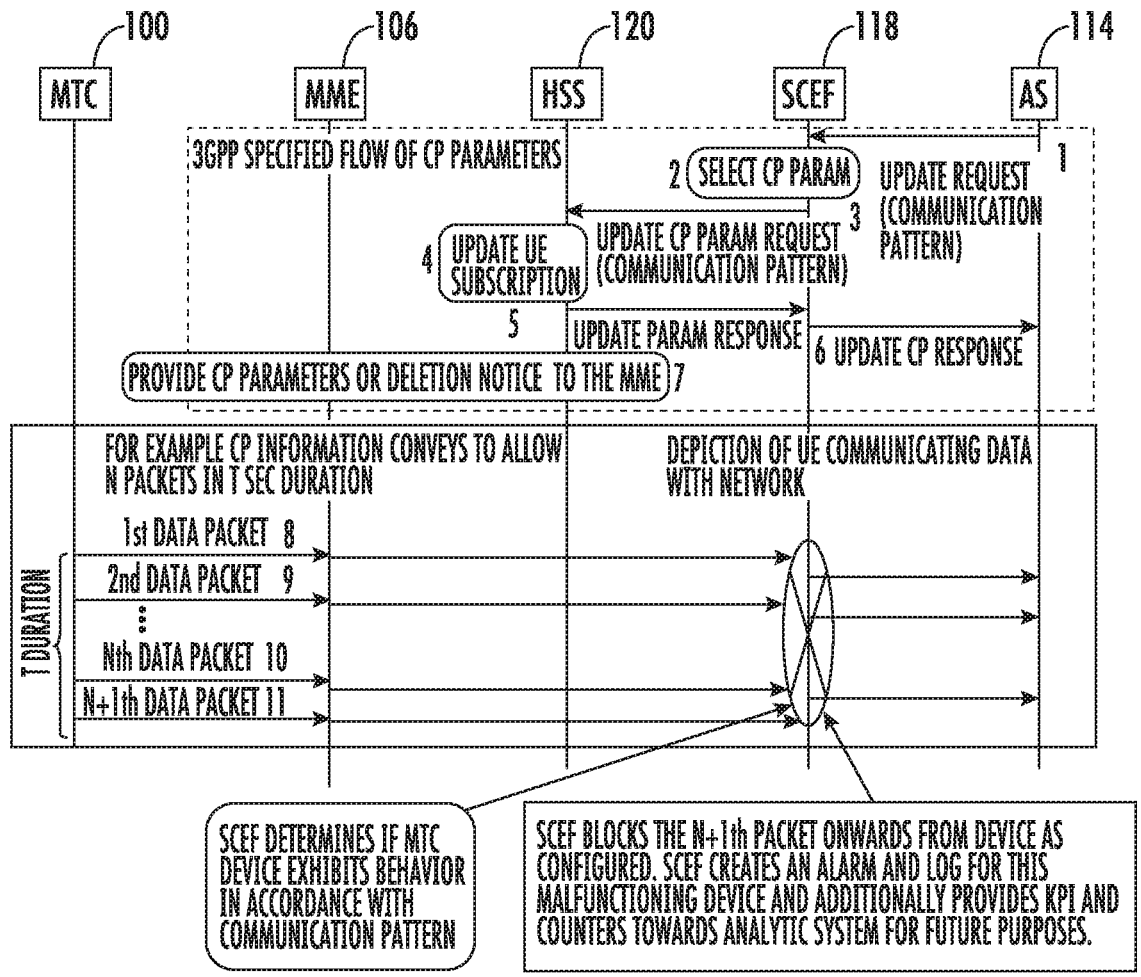
FIG. 5 is a message flow diagram illustrating detecting and mitigating effects of abnormal MTC device behavior at an SCEF.

In FIG. 4, MTC device behavior is monitored by DRA 122. In an alternate implementation, MTC device behavior may be monitored and policed by SCEF 118. FIG. 5 illustrates such an implementation. Referring to FIG. 5, in line 1 of the message flow diagram, AS 114 sends an update request message to SCEF 118. AS 114 uses this procedure to add, change, or delete CP information for MTC device 100. The update request may include an identifier for MTC device 100. In one example, the identifier may be a mobile subscriber integrated services digital network (MSISDN) number identifying MTC device 100. The update request may also include an identifier of AS 114, reference identifiers, CP parameter sets, validity times, and AS reference IDs for deletion.

Upon receiving the update request, SCEF 118 checks to see if AS 114 is authorized to send CP requests. SCEF 114 filters and selects the CP information parameter sets for add/modify/delete based on operator policy and/or configuration. In line 3, SCEF 118 sends the CP parameters to HSS 120.

HSS 120 examines the update CP parameter request message, e.g., with regard to the existence of the external identifier or MSISDN parameter. HSS 120 resolves the external identifier or MSISDN to an international mobile subscriber identifier (IMSI) and stores the CP parameter sets and their validity times as part of subscription data for the MTC device identified by the IMSI. The reason for storing the CP parameter sets by HSS 120 is so that the CP parameter sets can be forwarded to the serving MME when the serving MME is changed due to mobility of MTC device 100.

HSS 120 determines that a stored CP parameter set is to be modified by the fact that the SCEF reference ID associated with the CP parameters matches an SCEF reference ID for the CP parameter set already stored for a given MTC device. If HSS 120 determines that an existing CP parameter set is to be modified, HSS 120 discards the previously stored CP parameter set and stores the new CP parameter set under the same SCEF reference ID. HSS 120 stores the new CP parameter set along with the SCEF reference ID and validity time.

In line 5, HSS 120 sends the update CP parameter response with an SCEF reference ID and cause to SCEF 118. The cause value indicates a successful subscription update or the reason of failure of the subscription update. The update response message informs AS 114 as to whether the provisioning of the CP parameter set was successful. SCEF 118 sends a corresponding update response message to AS 114 in line 6. In line 7, HSS 120 invokes an insert subscription data procedure to send the CP parameter sets with the corresponding validity times, SCEF reference IDs, and SCEF reference IDs for deletion to MME 106.

Rather than simply providing the CP information parameters to HSS 120, SCEF 114 derives a rule for policing uplink communications from MTC device 100 from the CP parameters, stores the rule derived from the parameters, and uses the rule derived from the parameters to police uplink communications from MTC device 100. In the illustrated example, it is assumed that the rule derived from the CP information indicates that MTC device 100 is allowed to send N packets every T seconds. For data packets 1 to N, SCEF 114 determines that the MTC device 100 is performing as expected. However, upon receipt of the N+1th data packet, SCEF 114 blocks the N+1th data packet and any subsequent data packets from MTC device 100, generates an alarm, and logs an indication of the occurrence of the event that violated the MTC behavior defined by the CP information. SCEF 114 may provide the event log, packet counters, or other KPI information to an analytic system (not shown in FIG. 3) for further analysis.

Figure 6:
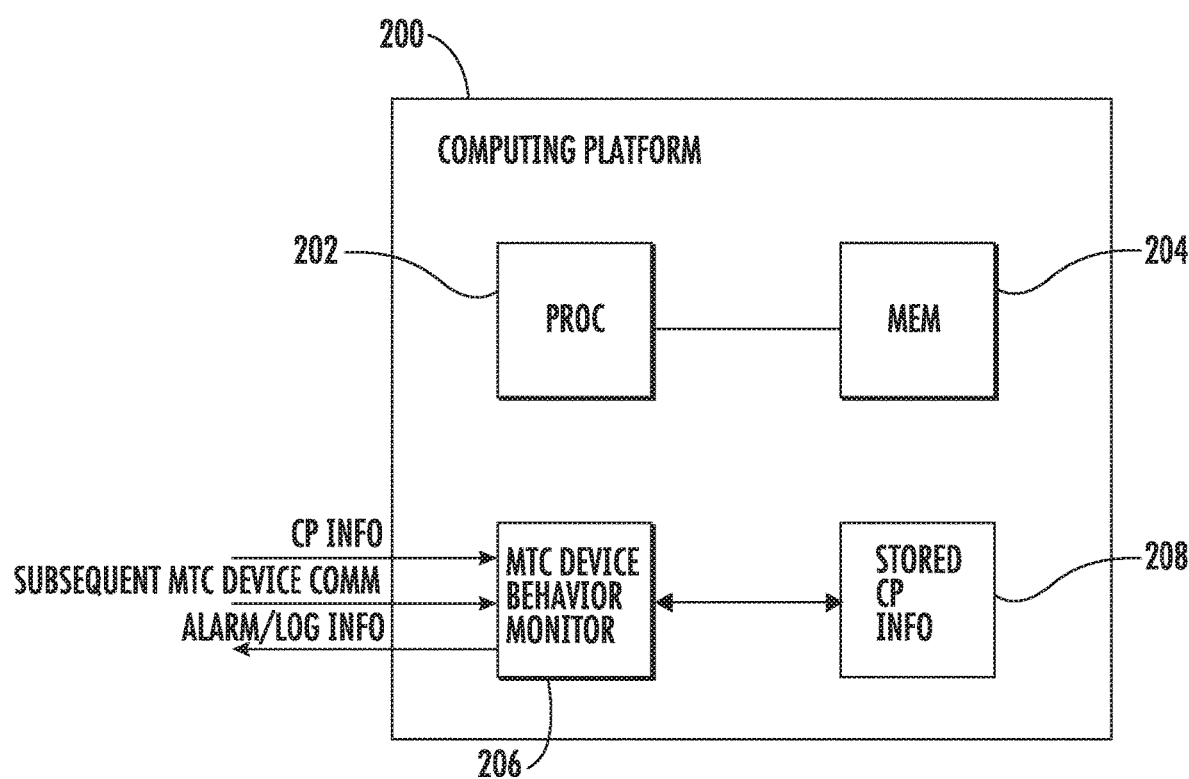
FIG. 6 is a block diagram illustrating an exemplary computing platform for detecting and mitigating effects of abnormal MTC device behavior.

FIG. 6 is a block diagram of an exemplary computing platform for misbehaving MTC device detection and for taking corrective action based on abnormal MTC device behavior. Referring to FIG. 6, computing platform 200 may implement MME 106, DRA 122, or SCEF 118, depending on where MTC device behavior is monitored on the network. In FIG. 6, computing platform 200 includes at least one processor 202 and memory 204. An MTC device behavior monitor 206 may be executable on processor 202 and may store CP parameter information in memory 204. MTC device behavior monitor receives CP information from MTC devices, derives rules for policing uplink behavior from the MTC devices, and stores the rules derived from the CP information. MTC device behavior monitor 206 also receives subsequent MTC device communications. MTC device behavior monitor 206 determines, using the stored rules derived from the CP information 208, whether an MTC device is behaving as expected. In response to determining that the MTC device is not behaving as expected, MTC device behavior monitor 206 may generate an alarm, log information, and perform a network security action such as blocking subsequent communications from the misbehaving MTC device.

If computing platform 200 implements an MME, such as MME 106, computing platform 200 may include an MME module (not shown) executable on processor 202 that performs MME functions. MME functions that may be implemented by the MME module may include signaling between an eNB and an HSS to authenticate MTC devices and UE devices to the network and facilitate MTC and UE mobility. Such functions may be performed in addition to the misbehaving MTC device detection functionality described herein, making computing platform a combined MME and misbehaving MTC device detector/mitigator. Providing a single computing platform that implements both MME functions and misbehaving MTC device detection and mitigation is advantageous because such a node reduces the need for a stand-alone platform for detecting and mitigating the effects of MTC device misbehavior. However, the subject matter described herein is not limited to using a combined platform that implements functionality in addition to misbehaving MTC device detection and mitigation. A computing platform that is dedicated to performing misbehaving device detection and mitigation is intended to be within the scope of the subject matter described herein.

In addition to the advantages mentioned in the preceding paragraph, it should also be noted that locating misbehaving MTC device detection and mitigation at the MME is advantageous because the MME is close to the entry point of misbehaving MTC device traffic to the network. Detecting and stopping misbehaving MTC device traffic near the entry point of the network prevents such traffic from affecting other network elements downstream from the MME, such as the PGW, SGW, etc.

If computing platform 200 implements a DRA, such as DRA 122, computing platform 200 may include Diameter routing module (not shown) executable on processor 202 that performs Diameter routing and related functions. Diameter routing and related functions that may be performed by computing platform 200 in addition to misbehaving MTC device detection and mitigation include routing Diameter signaling messages based on Diameter level information in the messages, including Diameter destination and Diameter realm-based routing.

Another function that may be performed by computing platform 200 implementing a DRA in addition to misbehaving MTC device detection and mitigation is Diameter screening, which may include screening Diameter signaling messages based on Diameter level information in the messages. For example, Diameter screening may include screening Diameter signaling messages based on originating and/or destination Diameter address parameters, such as origin realm, origin host, destination realm, and/or destination host.

Yet another function that may be performed by computing platform 200 implementing a DRA in addition to misbehaving MTC device detection and mitigation is Diameter topology hiding. Diameter topology hiding may include receiving Diameter messages, determining whether Diameter topology hiding is required for the messages, and, in response to determining that Diameter topology hiding is required, replacing Diameter hiding Diameter topology information in the messages. Determining whether Diameter topology hiding is required may include determining whether the origin realm from which a received Diameter signaling message is sent requires Diameter topology hiding to be performed for the destination realm specified in the Diameter signaling message. Computing platform 200 may be configured with information that indicates whether Diameter topology hiding is required for different combinations of origin and destination realms. Performing Diameter topology hiding may include replacing or encrypting Diameter origin parameters, such as origin host and origin realm parameters, in messages for which Diameter topology hiding is indicated.

Providing a single computing platform that implements both DRA functions and misbehaving MTC device detection and mitigation is advantageous because such a node reduces the need for a stand-alone platform for detecting and mitigating the effects of MTC device misbehavior. In addition, performing misbehaving MTC device detection and mitigation at a DRA may be advantageous because a DRA can be a central node through which traffic from misbehaving MTC devices located in plural different locations can be detected and stopped. For example, a DRA may receive traffic from plural MMEs that are connected to different eNBs that serve different geographic areas. If misbehaving MTC device detection and mitigation is performed at a DRA that serves multiple connected MMEs, the need to deploy misbehaving MTC device detection and mitigation at each of the individual MMEs is reduced. Thus, deploying MTC device detection and mitigation at a DRA may be more efficient for an initial deployment and for upgrades to misbehaving MTC device detection and mitigation than deploying misbehaving MTC device detection and mitigation at the each of the individual MMEs.

If computing platform 200 implements an SCEF, such as SCEF 118, computing platform 200 may include an SCEF module (not shown) executable on processor 202 that performs SCEF functions. SCEF functions that many be implemented by an SCEF module may include SCEF functionality as specified by 3GPP Technical Specification (TS) 23.682 (full cite below). Providing SCEF functionality includes providing access to 3GPP services for non-IP devices, such as MTC or Internet of things (IoT) devices that do not implement an IP stack due to complexity and power conservation requirements. A typical MTC or IoT device that might require SCEF services is a sensor that transmits its data to a network periodically and then sleeps between transmissions to conserve energy. In the case of mobile devices, SCEF functionality provided by the SCEF module may include determining the location and connectivity of the mobile devices (including location and connectivity of non-IP devices) using network resources, such as the HSS and the MME, to avoid the need for the mobile devices to have built in location determining capabilities, such as GPS capabilities. The SCEF module may also, for non-IP traffic from MTC devices, such as IoT devices, determine whether to invoke MTC/IoT service handling based on the access point name or other attributes of a received message.

SCEF functions may be performed in addition to the misbehaving MTC device detection functionality described herein, making computing platform a combined MME and misbehaving MTC device detector/mitigator. Providing a single computing platform that implements both SCEF functions and misbehaving MTC device detection and mitigation is advantageous because such a node reduces the need for a stand-alone platform for detecting and mitigating the effects of MTC device misbehavior.

In addition, implementing a misbehaving MTC device detection and effects mitigation on a computing platform that also implements SCEF functionality may be advantageous because a platform that already implements SCEF functionality is pre-configured to communicate with MTC devices, such as IoT devices. As a result, misbehaving MTC device detection and effects mitigation may be efficiently implemented as an application service that utilizes the existing protocol stack of the SCEF to communicate with MTC devices.

It should also be noted that computing platform 200 can be implemented as an on-premise service of a network service provider or as a cloud service that provides misbehaving MTC device detection and effects mitigation as a cloud service. In another exemplary implementation, misbehaving MTC device detection and behavior analysis may be implemented as a cloud service, and misbehaving MTC device behavior effects mitigation may be implemented as an on-premise service. Any combination of cloud and on-premise services is intended to be within the scope of the subject matter described herein.

Figure 7:
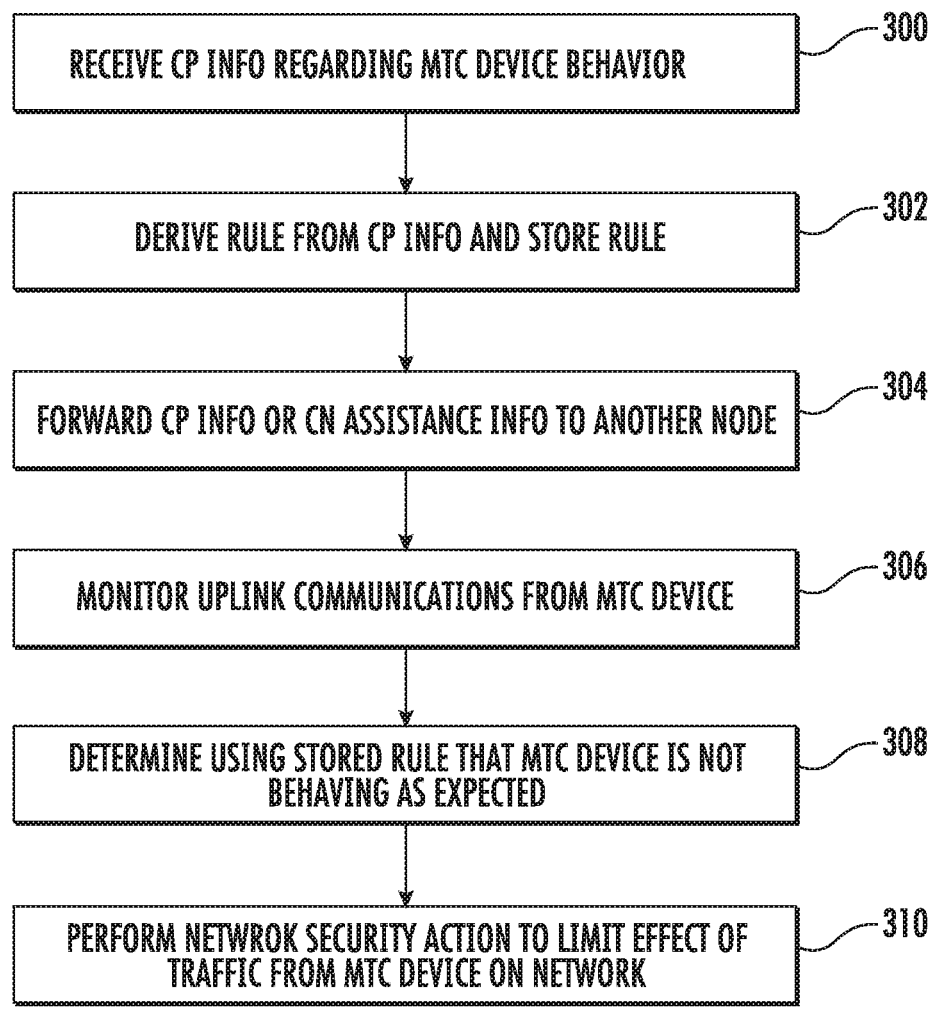
FIG. 7 is a flow chart illustrating an exemplary process for detecting and mitigating effects of abnormal MTC device behavior.

FIG. 7 is a flow chart illustrating an exemplary process for MTC device, misbehavior detection and effects mitigation. Referring to FIG. 7, in step 300, CP information from which CN assistance information for tuning an eNB to minimize MTC device state transitions is derivable is received. For example, MTC device behavior monitor 206 may receive CP information. If MTC device behavior monitor 206 is implemented as a component of an MME, MTC device behavior monitor may derive the CN assistance information from the CP information.

In step 302, a rule is derived from the received CP information, and the rule derived from the CP information is stored. For example, MTC device behavior monitor 206 may receive CP information that defines a communication time and duration for an MTC device and define a rule that indicates that the MTC device is allowed to communicate with the network at the given time plus or minus a tolerance interval and for the given duration, plus or minus a duration tolerance. The rule may specify two actions, depending on the behavior of the MTC device. If communications from the MTC device are within the time and duration tolerances, rule may indicate that communications from the MTC device are allowed and no network security action is needed. If communications from the MTC device are outside of the time or duration tolerance, the rule may specify that the communications from the MTC device are to be blocked or buffered and that a notification message is to be sent to the network operator. The rule derived from the received CP information may be stored in memory of the telecommunications network node and indexed by an identifier for the MTC device or devices for which the rule is defined.

In step 304, the received CP information or the CN assistance information derived from the CP information is forwarded to another telecommunications network node. For example, if the network node implementing abnormal MTC device behavior detection is an MME, the CN assistance information derived from the CP information may be forwarded to the eNB, which uses the CN assistance information to optimize communications with MTC device 100. If the network node implementing abnormal MTC device behavior detection is a DRA, the DRA may forward the received CP information to the MME, which derives the CN assistance information and sends the CN assistance information to the eNB. If the network node implementing abnormal MTC device behavior detection is an SCEF, the SCEF may forward the received CP information to the HSS, which forwards the CP information to the DRA, and which forwards the CP information to the MME.

In step 306, uplink communications from an MTC device are monitored. For example, MTC device behavior monitor 206 may receive packets containing MTC generated information. The term "uplink communications" refers to communications sent from the MTC device to the network. MTC device behavior monitor 206 may use MTC identifying information in uplink packets from the MTC device to determine whether a rule is stored for policing uplink communications from the MTC device. In this example, it is assumed that MTC device behavior monitor 206 locates a rule for policing packets received from the MTC device.

Accordingly, in step 308, the process includes determining, using the rule derived from the stored CP information, that the MTC device is not behaving as expected. For example, MTC device behavior monitor 206 may determine that an MTC device is communicating more frequently than allowed by the rule derived from the CP information parameters, sending more data than specified by the rule, or other behavior that is outside of a range or tolerance of normal MTC device behavior specified by the rule.

In step 310, a network security action is performed to limit the effect of traffic from the MTC device on the network. For example, MTC device behavior monitor 206 may block or buffer packets from the MTC device and generate an alarm or other notification to the network operator and log information regarding MTC device behavior. MTC device behavior monitor 206 may also block subsequent communications from the misbehaving MTC device. As stated above, notifying the network operator may be effected through any suitable means configured by the network operators. Example notification methods include short message (SMS), email, hypertext transfer protocol (HTTP), etc.

Figure 8:
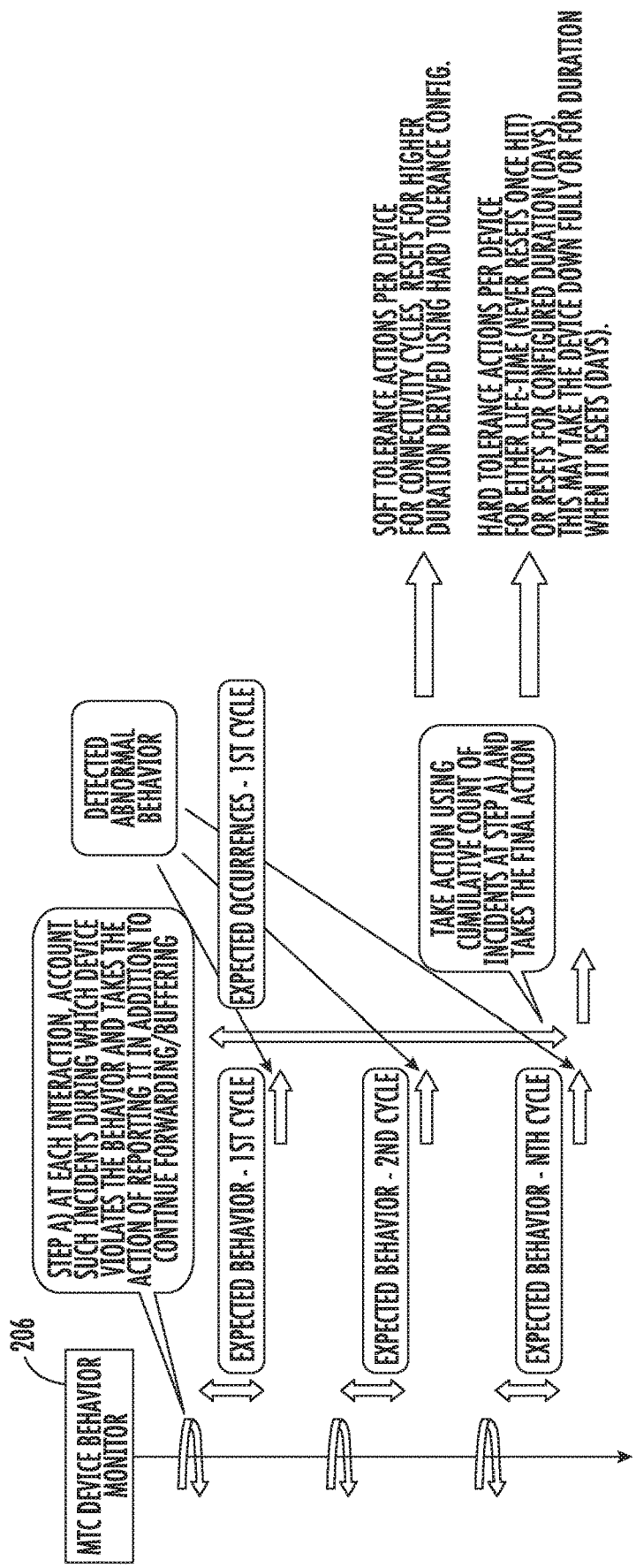
FIG. 8 is a message flow diagram illustrating exemplary actions taken by MTC device behavior monitor 206 in response to detecting unexpected MTC device behavior.

FIG. 8 is a message flow diagram illustrating exemplary steps that may be performed by MTC device behavior monitor 206 in detecting and mitigating the effects of abnormal MTC device behavior. Referring to FIG. 8, in step A, at each interaction with an MTC device, MTC device behavior monitor 206 counts incidents in which the MTC violates a behavior standard or behaves abnormally during an MTC device connectivity cycle and takes the action of reporting the abnormal behavior in addition to continuing to forward and buffer traffic from the MTC device. When another instance of unexpected behavior occurs during the next connectivity cycle, MTC device behavior monitor 206 logs the unexpected behavior and continues to buffer and forward traffic from the MTC device. When the MTC device behavior monitor 206 detects the abnormal behavior during the nth consecutive communication cycle from the MTC device or if the number of incidents of abnormal behavior exceeds a threshold, MTC device behavior monitor 206 takes a network security action using the cumulative count of abnormal behavior incidents and also takes a final action. The final action may include soft tolerance actions per MTC device for connectivity cycles of the device, including resets for higher duration connections. The soft tolerance actions may be derived using hard tolerance configuration information. The final action may also include hard tolerance actions per MTC device for either the lifetime of the MTC device (the MTC device never resets once deactivated) or resets for a configured duration, such as a number of days. Such a reset may take the MTC device down completely or only for a duration when the MTC device resets. The actions performed by MTC device monitor 206 may be reported with event/info and an indication of minor severity for soft limits and with critical/major/severity for hard tolerance actions.

Figure 9:
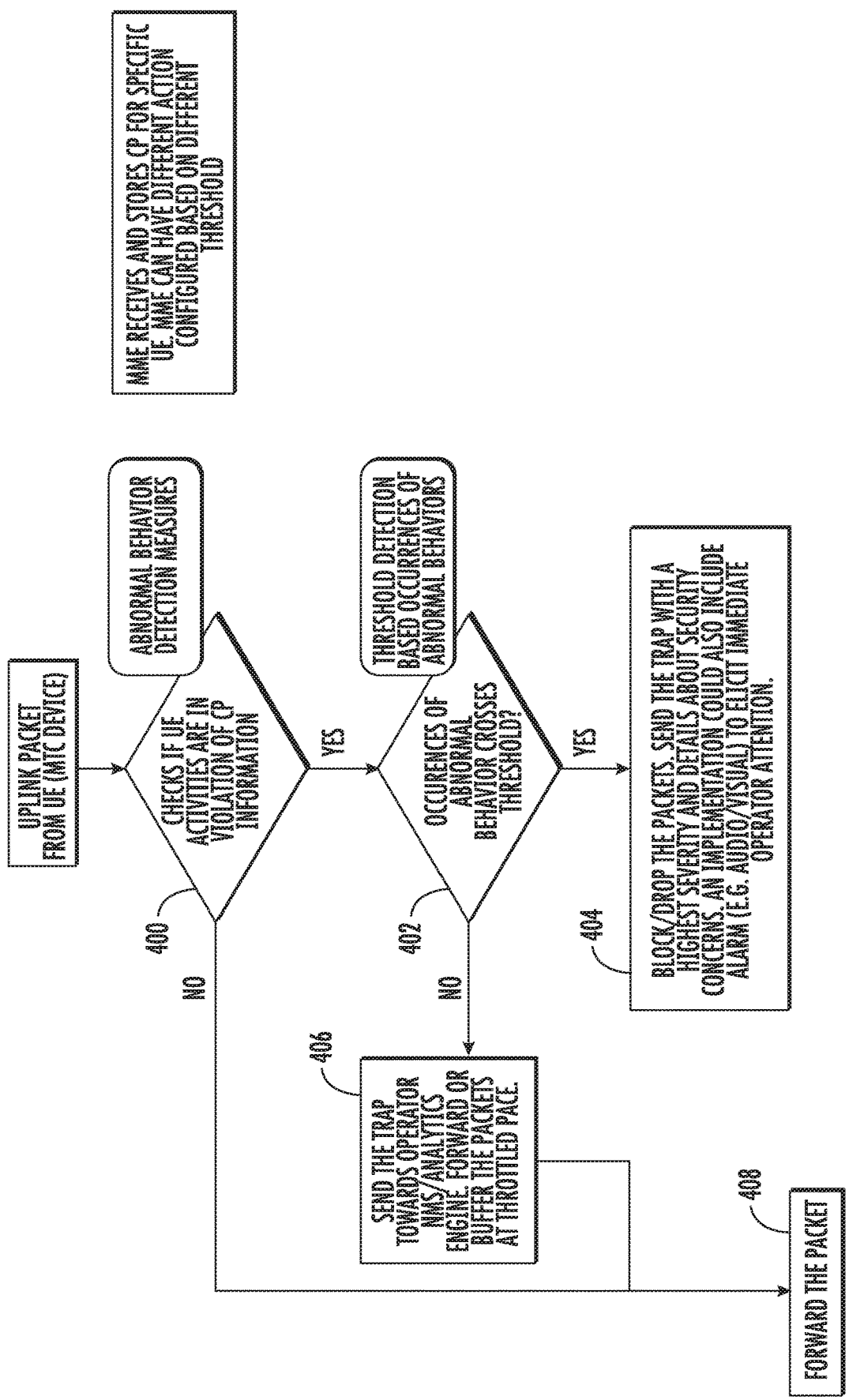
FIG. 9 is a flow chart illustrating exemplary steps performed by MTC device behavior monitor 206 in detecting and mitigating abnormal MTC device behavior.

FIG. 9 is a flow chart illustrating new exemplary process performed by MTC device behavior monitor 206 in detecting and mitigating abnormal MTC device behavior. Referring to FIG. 9, in step 400, MTC device behavior monitor 206 receives an uplink packet from a UE or MTC device. MTC device behavior monitor 206 checks to see if the UE activities are in violation of the CP information. The CP parameters may be specific to the UE and stored by the MME. The MME can have different actions configured based on different thresholds. In step 402, MTC behavior monitor 206 determines whether the number of occurrences of abnormal behavior crosses a threshold. If the number of occurrences of abnormal behavior for a particular MTC device crosses the threshold, control proceeds to step 404 where packets from the offending MTC device are blocked or dropped. A trap with the highest severity and details about security concerns may be sent to the network operator. Audio and visual alarms may also be generated to elicit immediate operator attention. Returning to step 402, if the number of occurrences of the abnormal event have not crossed the threshold, control proceeds to step 406 where a trap is sent to the network monitoring system (NMS) or network operator analytics engine. Packets from the MTC device are forwarded or buffered at a throttled pace. In step 408, the packet is sent to its destination. Control then returns to step 400, where the next packet is processed. The following table illustrates 3GPP-specified CP information parameters that may be used by MTC device behavior monitor 206 to derive rules usable to identify and mitigate the effects of misbehaving MTC devices.

TABLE 1

3GPP-Specified CP Information Parameters

| CP parameter | Description |
| --- | --- |
| 1) Periodic communication indicator | Identifies whether the UE communicates periodically or not, e.g. only on demand. [optional] |
| 2) Communication duration time | Duration interval time of periodic communication [optional, may be used together with 1)] Example: 5 minutes |
| 3) Periodic time | Interval Time of periodic communication [optional, may be used together with 1)] Example: every hour |
| 4) Scheduled communication time | Time zone and Day of the week when the UE is available for communication [optional] Example: Time: 13:00-20:00, Day: Monday |
| 5) Stationary indication | Identifies whether the UE is stationary or mobile [optional] |

The parameters in Table 1 are specified in Section 5.10 of 3GPP TS 23.682. MTC device behavior monitor 206 may use any one or more of these parameters to define a rule usable to detect a misbehaving MTC device. For example, MTC device behavior monitor 206 may receive and store the periodic communication indicator, communication time, interval time, and scheduled communication time for configuring an MTC device. MTC device behavior monitor 206 may define a rule from this combination of indicators indicating that the MTC device is supposed to send data for 1 s to the AS once per day at 10:00 am EST and that communications longer than this duration or at a time other than the specified time are abnormal. If the MTC device communicates at the specified time for the specified duration, then MTC device behavior monitor 206 may log the MTC device behavior along with an indicator that the behavior is normal. If the MTC device communicates for longer than the specified duration, more frequently that the specified interval time, or at a different time than the specified time, MTC device behavior monitor 206 may log the behavior along with an indicator that the behavior is abnormal. If the abnormal behavior occurs more than a configured number of times, MTC device behavior monitor 206 may block subsequent communications from the MTC device.

The following additional CP information parameters may be used by MTC device behavior monitor 206 to define rules for detecting a misbehaving MTC device and mitigating the effects of such behavior.

TABLE 2

Additional CP Information Parameters

| Occurrence-duration | Duration that the network allows the MTC device to gracefully continue working in network |
| --- | --- |
| Occurrence-count | Counts of occurrences of device communications with network |
| Occurrence-final-action | Action by network for the device when device exceeds one of (count, duration) |

In Table 2, the occurrence-duration parameter may be used by MTC device behavior monitor 206 to define a rule for detecting a misbehaving MTC device based on how long the device communicates with the network once a given communication from the MTC device begins. For example, if the occurrence duration parameter specifies that the device can communicate with the network for a total of no more than 1 minute, a rule may be defined that indicates an allowed communication duration for the particular device for 1 minute plus or minus a 10 second tolerance interval. If the device communicates for 10 minutes, then MTC device behavior monitor 206 may allow the traffic for the first 1 minute and 10 seconds, and after 1 minute and 10 seconds, initiate blocking of traffic from the MTC device and log the behavior along with an indication that the behavior is abnormal. MTC device behavior monitor 206 may use the occurrence-count parameter to define a rule usable to determine whether the number of discrete times that a device communicates with the network is normal or abnormal. For example, if the network allows an MTC device to communicate with the network once per day, a rule may be defined that allows communications once per day and blocks communications after the first communication in a given day. If the device communicates with the network twice in one day, MTC device behavior monitor 206 may allow the first communication, block the second communication, and log the second communication along with an indication that the second communication is abnormal. The occurrence-final-action parameter may be used by MTC device behavior monitor 206 to determine what network security action to take when MTC device misbehavior is detected. For example, the occurrence-final-action parameter may specify that communications from a misbehaving MTC device are to be blocked and logged once abnormal behavior is detected.

MTC device behavior monitor 206 may generate records for events, procedures, and actions relating to MTC device behavior. MTC device behavior monitor 206 may generate statistical data regarding MTC misbehavior events for reporting to the network operator and for further analysis. For the purpose of network KPI and monitoring, MTC device behavior monitor 206 may register and report occurrences of MTC device misbehavior to the application server, either through network monitoring system (NMS) or SCEF 118. The application server may embed special handling or procedures for respective device[s] may or could apply business logic.

Exemplary advantages of the subject matter described herein include the following.
1. Reusing already available communication pattern information to detect malfunctioning at the LTE network edge rather than after.
2. Protection of network bandwidth between the MME, SCEF, and AS for malfunctioning devices.
3. Prevention of denial of service, attacks, outages at the entry point to the network (for the MME implementation).

The subject matter described herein, by detecting and mitigating misbehaving MTC devices at the MME, DRA, or SCEF, provides for early detection of faulty MTC device behavior. Such early detection of misbehaving MTC devices can improve network performance and security by preventing traffic from faulty MTC devices from overloading other network nodes with MTC device traffic. Detecting and mitigating misbehaving MTC devices at the MME, DRA, or SCEF also provides centralization to the detection and mitigation function. Centralization of the misbehaving MTC device detection and mitigation can reduce the cost and labor required to update misbehaving MTC device detection and mitigation rules.

REFERENCES

The following references disclose 3GPP specified usage of the CP information. The disclosure of each of the following references is hereby incorporated herein by reference in its entirety.
3GPP TS 23.401—General Packet Radio Service (GPRS) enhancements for Evolved Universal Terrestrial Radio Access Network (E-UTRAN) access, Release 15 (March 2018).
3GPP TS 23.682 V15.4.0—Architecture enhancements to facilitate communications with packet data networks and applications, Release 15, (March 2018).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for detecting and mitigating effects of abnormal machine type communication (MTC) device behavior, the method comprising:
at a telecommunications network node comprising one of a mobility management entity (MME), a Diameter routing agent (DRA), and a service capability exposure function (SCEF):
receiving, by the telecommunications network node, communication pattern (CP) information from which core network (CN) assistance information for tuning an evolved node B (eNB) to minimize MTC device state transitions is derivable;
forwarding, by the telecommunications network node, the CP information or the CN assistance information to another network node;
deriving, by the telecommunications network node and from the CP information, a rule for policing uplink communications from the MTC device and storing the rule in memory of the telecommunications network node;
monitoring, by the telecommunications network node, the uplink communications from the MTC device;
determining, by the telecommunications network node, during a first connectivity cycle of the MTC device, and using the stored rule derived from the CP information, that the MTC device is not behaving in accordance with an expected behavior; and
in response to determining that the MTC device is not behaving in accordance with the expected behavior, incrementing, by the telecommunications network node, a count of incidents in which the MTC device is determined to violate the rule and determining that the count of incidents does not exceed a threshold defined for consecutive connectivity cycles of the MTC device;
determining, by the telecommunications network node, during a second connectivity cycle of the MTC device, and using the stored rule derived from the CP information, that the MTC device is not behaving in accordance with the expected behavior, incrementing the count of incidents, determining that the count exceeds the threshold, and, in response to determining that the count exceeds the threshold defined for consecutive connectivity cycles of the MTC device, performing, by the telecommunications network node, a network security action that mitigates an effect of traffic from the MTC device on the network, wherein performing the network security action includes resetting the MTC device.

2. The method of claim 1 wherein the telecommunications network node comprises an MME and wherein forwarding the CP information or the CN assistance information to another network node comprises forwarding the CN assistance information the eNB.

3. The method of claim 1 wherein the telecommunications network node comprises a DRA and wherein forwarding the CP information or the CN assistance information to another network node comprises forwarding CP information to a mobility management entity (MME).

4. The method of claim 1 wherein the telecommunications network node comprises an SCEF and wherein forwarding the CP information or the CN assistance information to another network node includes filtering the CP information and forwarding the filtered CP information to an HSS.

5. The method of claim 1 wherein receiving the CP information includes receiving the CP information from a home subscriber server (HSS).

6. The method of claim 1 wherein the CP information specifies a duration that the MTC device is configured to communicate with the network and wherein determining that the MTC device is not behaving in accordance with the expected behavior includes detecting communication from the device for a time period that exceeds the duration.

7. The method of claim 1 wherein the CP information specifies an occurrence count of a number of communications from the MTC device within a time period and wherein determining that the MTC device is not behaving in accordance with the expected behavior includes detecting that the number of communications from the MTC device within the time period exceeds the count.

8. The method of claim 1 comprising logging behavior of the MTC device.

9. The method of claim 1 wherein performing the network security action includes notifying a network operator of behavior of the MTC device that is not in accordance with he expected behavior.

10. A system for detecting and mitigating effects of abnormal machine type communication (MTC) device behavior, the system comprising:
a telecommunications network node comprising one of a mobility management entity (MME), a Diameter routing agent (DRA), and a service capability exposure function (SCEF) and having at least one processor; and
an MTC device behavior monitor comprising a component of the telecommunications network node and implemented by the at least one processor for receiving communication pattern (CP) information from which core network (CN) assistance information for tuning an evolved node B (eNB) to minimize MTC device state transitions is derivable, forwarding the CP information or the CN assistance information to another network node, deriving, from the CP information, a rule for uplink communications from the MTC device and storing the rule in memory of the telecommunications network node, monitoring the uplink communications from the MTC device, determining, during a first connectivity cycle of the MTC device and using the stored rule derived from the CP information, that the MTC device is not behaving in accordance with an expected behavior; and, in response to determining that the MTC device is not behaving in accordance with the expected behavior, incrementing, a count of incidents in which the MTC device is determined to violate the rule and determining that the count of incidents does not exceed a threshold defined for consecutive connectivity cycles of the MTC device, determining, during a second connectivity cycle of the MTC device and using the stored rule derived from the CP information, that the MTC device is not behaving in accordance with the expected behavior, incrementing the count of incidents, determining that the count exceeds the threshold, and, in response to determining that the count exceeds the threshold defined for consecutive connectivity cycles of the MTC device, performing a network security action that mitigates an effect of traffic from the MTC device on the network, wherein performing the network security action includes resetting the MTC device.

11. The system of claim 10 wherein telecommunications network node comprises an MME and wherein forwarding the CP information or the CN assistance information to another network node comprises forwarding the CN assistance information the eNB.

12. The system of claim 10 wherein the telecommunications network node comprises a DRA and wherein forwarding the CP information or the CN assistance information to another network node comprises forwarding CP information to a mobility management entity (MME).

13. The system of claim 10 wherein the telecommunications network node comprises an SCEF and wherein forwarding the CP information or the CN assistance information to another network node includes filtering the CP information and forwarding the filtered CP information to an HSS.

14. The system of claim 10 wherein the CP information specifies a duration that the MTC device is configured to communicate with a network and wherein determining that the MTC device is not behaving in accordance with the expected behavior includes detecting that the MTC device communicates with the network for a time period that exceeds the duration.

15. The system of claim 10 wherein the CP information specifies an occurrence count of a number of communications from the MTC device within a time period and wherein determining that the MTC device is not behaving in accordance with the expected behavior includes detecting that the number of communications from the MTC device within the time period exceeds the count.

16. The system of claim 10 wherein the MTC device behavior monitor is configured to log an indication of behavior of the MTC device.

17. The system of claim 10 wherein MTC device behavior monitor is configured to notify a network operator of behavior of the MTC device that is not in accordance with he expected behavior.

18. A non-transitory computer readable medium having stored thereon executable instructions that when executed by a processor of a computer controls the computer to perform steps comprising:
at a telecommunications network node comprising one of a mobility management entity (MME), a Diameter routing agent (DRA), and a service capability exposure function (SCEF):
receiving, by the telecommunications network node, communication pattern (CP) information from which core network (CN) assistance information for tuning an evolved node B (eNB) to minimize MTC device state transitions is derivable;
forwarding, by the telecommunications network node, the CP information or the CN assistance information to another network node;
deriving, by the telecommunications network node and from the CP information, a rule for policing uplink communications from the MTC device and storing the rule in memory of the telecommunications network node;
monitoring, by the telecommunications network node, the uplink communications from the MTC device;
determining, by the telecommunications network node, during a first connectivity cycle of the MTC device, and using the stored rule derived from the CP information, that the MTC device is not behaving in accordance with an expected behavior; and
in response to determining that the MTC device is not behaving in accordance with the expected behavior, incrementing, by the telecommunications network node a count of incidents in which the MTC device is determined to violate the rule and determining that the count of incidents does not exceed a threshold defined for consecutive connectivity cycles of the MTC device;
determining, by the telecommunications network node, during a second connectivity cycle of the MTC device, and using the stored rule derived from the CP information, that the MTC device is not behaving in accordance with the expected behavior, incrementing the count of incidents, determining that the count exceeds the threshold, and, in response to determining that the count exceeds the threshold defined for consecutive connectivity cycles of the MTC device, performing, by the telecommunications network node, a network security action that mitigates an effect of traffic from the MTC device on the network, wherein performing the network security action includes resetting the MTC device.

\* \* \* \* \*

UNITED STATES PATENT AND TRADEMARK OFFICE
CERTIFICATE OF CORRECTION

PATENT NO. : 11,146,577 B2
APPLICATION NO. : 15/990196
DATED : October 12, 2021
INVENTOR(S) : Gupta et al.

It is certified that error appears in the above-identified patent and that said Letters Patent is hereby corrected as shown below:

On the Title Page

On page 2, Column 1, item (57) under Abstract, Line 1, after "response" insert -- to --.

On page 3, Column 1, item (56) under Other Publications, Line 68, delete "applictions" and insert -- applications --, therefor.

On page 3, Column 2, item (56) under Other Publications, Line 1, delete "Telecommunication" and insert -- Telecommunications --, therefor.

In the Drawings

On sheet 7 of 9, in FIG. 7, under Reference Numeral 310, Line 1, and on the Title Page, in the print figure, delete "NETWROK" and insert -- NETWORK --, therefor.

In the Claims

In Column 16, Line 44, in Claim 2, after "information" insert -- to --.

In Column 17, Line 9, in Claim 9, delete "he" and insert -- the --, therefor.

In Column 17, Line 56, in Claim 11, after "information" insert -- to --.

In Column 18, Line 20, in Claim 17, delete "he" and insert -- the --, therefor.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*